(12) United States Patent
Ahnert et al.

(10) Patent No.: US 8,764,048 B1
(45) Date of Patent: Jul. 1, 2014

(54) FOLDABLE, REMOVABLE, REVERSIBLE STROLLER SEAT

(75) Inventors: Stephen Ahnert, Philadelphia, PA (US); Roy L. Dean, Pottstown, PA (US); Michael A. Dotsey, Pottstown, PA (US)

(73) Assignee: Graco Children's Products Inc., Atlanta, GA (US)

( * ) Notice: Subject to any disclaimer, the term of this patent is extended or adjusted under 35 U.S.C. 154(b) by 522 days.

(21) Appl. No.: 12/684,822

(22) Filed: Jan. 8, 2010

Related U.S. Application Data

(60) Provisional application No. 61/143,382, filed on Jan. 8, 2009.

(51) Int. Cl.
*B62B 7/14* (2006.01)

(52) U.S. Cl.
USPC .......................................... 280/658; 280/47.4

(58) Field of Classification Search
USPC ................. 280/47.38, 47.39, 47.4, 642–644, 280/647–650, 657, 658, 47.25
See application file for complete search history.

(56) References Cited

U.S. PATENT DOCUMENTS

| | | | | |
|---|---|---|---|---|
| 5,820,144 A | * | 10/1998 | Wang | 280/47.38 |
| 6,086,086 A | * | 7/2000 | Hanson et al. | 280/650 |
| 6,513,827 B1 | | 2/2003 | Barenbrug | |
| 6,715,783 B1 | * | 4/2004 | Hanson et al. | 280/642 |
| 7,032,922 B1 | * | 4/2006 | Lan | 280/648 |
| 7,066,542 B2 | | 6/2006 | Wang | |
| 7,364,183 B2 | * | 4/2008 | Lee | 280/642 |
| 7,377,537 B2 | * | 5/2008 | Li | 280/650 |
| 7,455,362 B2 | * | 11/2008 | Hanson et al. | 297/363 |
| 8,061,732 B2 | * | 11/2011 | Song et al. | 280/650 |
| 2007/0296182 A1 | * | 12/2007 | Saville et al. | 280/642 |
| 2010/0117315 A1 | | 5/2010 | Yu et al. | |

FOREIGN PATENT DOCUMENTS

| | | |
|---|---|---|
| DE | 100 11 588 | 1/2001 |
| DE | 10 2004 022 843 | 12/2004 |
| DE | 20 2004 018 180 | 2/2005 |
| EP | 567 422 | 10/1993 |
| EP | 519 857 | 1/1995 |
| EP | 1 366 987 | 12/2003 |
| GB | 2 282 322 | 5/1995 |
| GB | 2 446 236 | 8/2008 |
| WO | WO 93/07039 | 4/1993 |
| WO | WO 2007/053021 | 5/2007 |
| WO | WO 2009/077787 | 6/2009 |
| WO | WO 2009/077788 | 6/2009 |

* cited by examiner

*Primary Examiner* — Katy M Ebner
(74) *Attorney, Agent, or Firm* — Lempia Summerfield Katz LLC

(57) ABSTRACT

A stroller seat has a seat back, a seat bottom, a seat hub assembly joining the seat back to the seat bottom, and an actuator carried on the seat. The actuator can be actuated to permit adjusting the recline angle of the seat back and seat bottom as a unit and can be actuated to permit folding the seat back relative to the seat bottom.

20 Claims, 9 Drawing Sheets

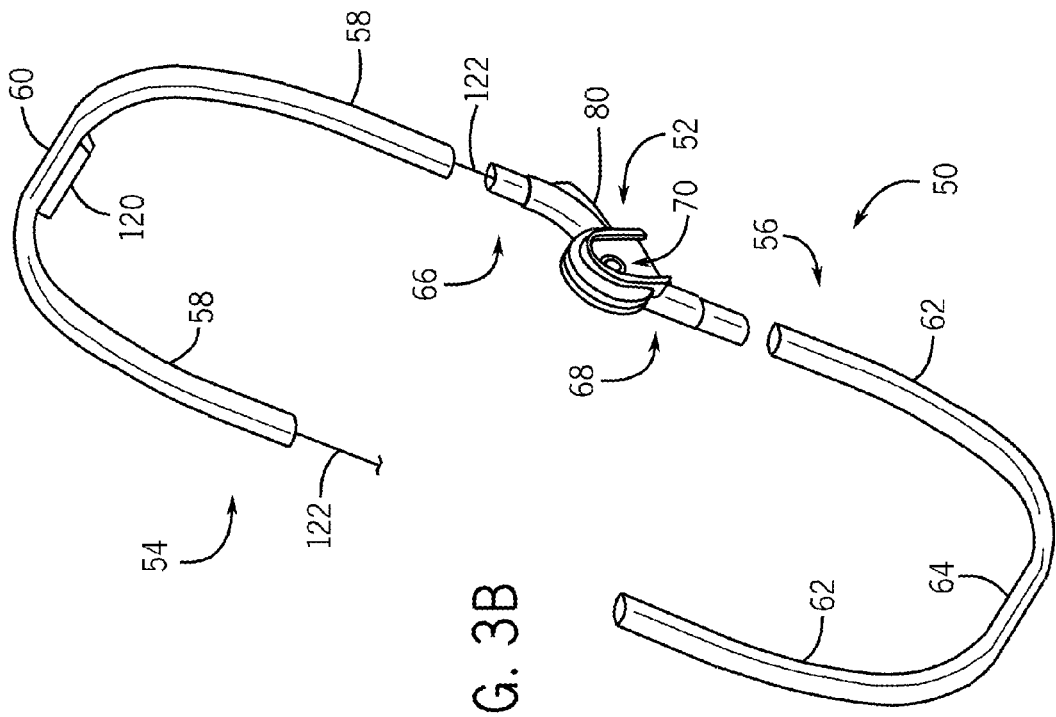
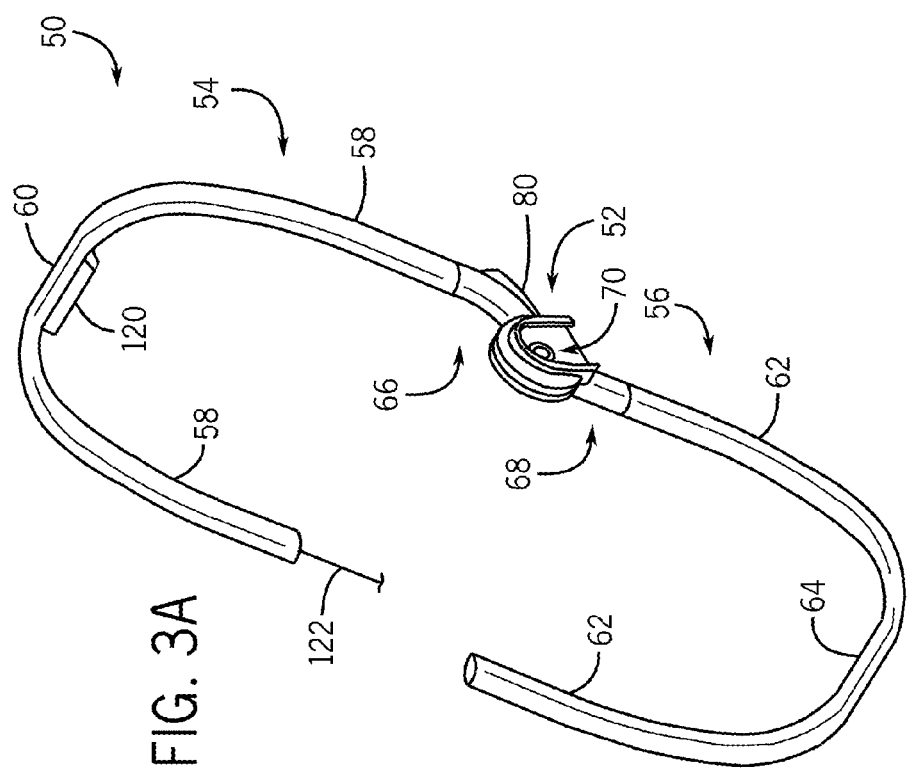

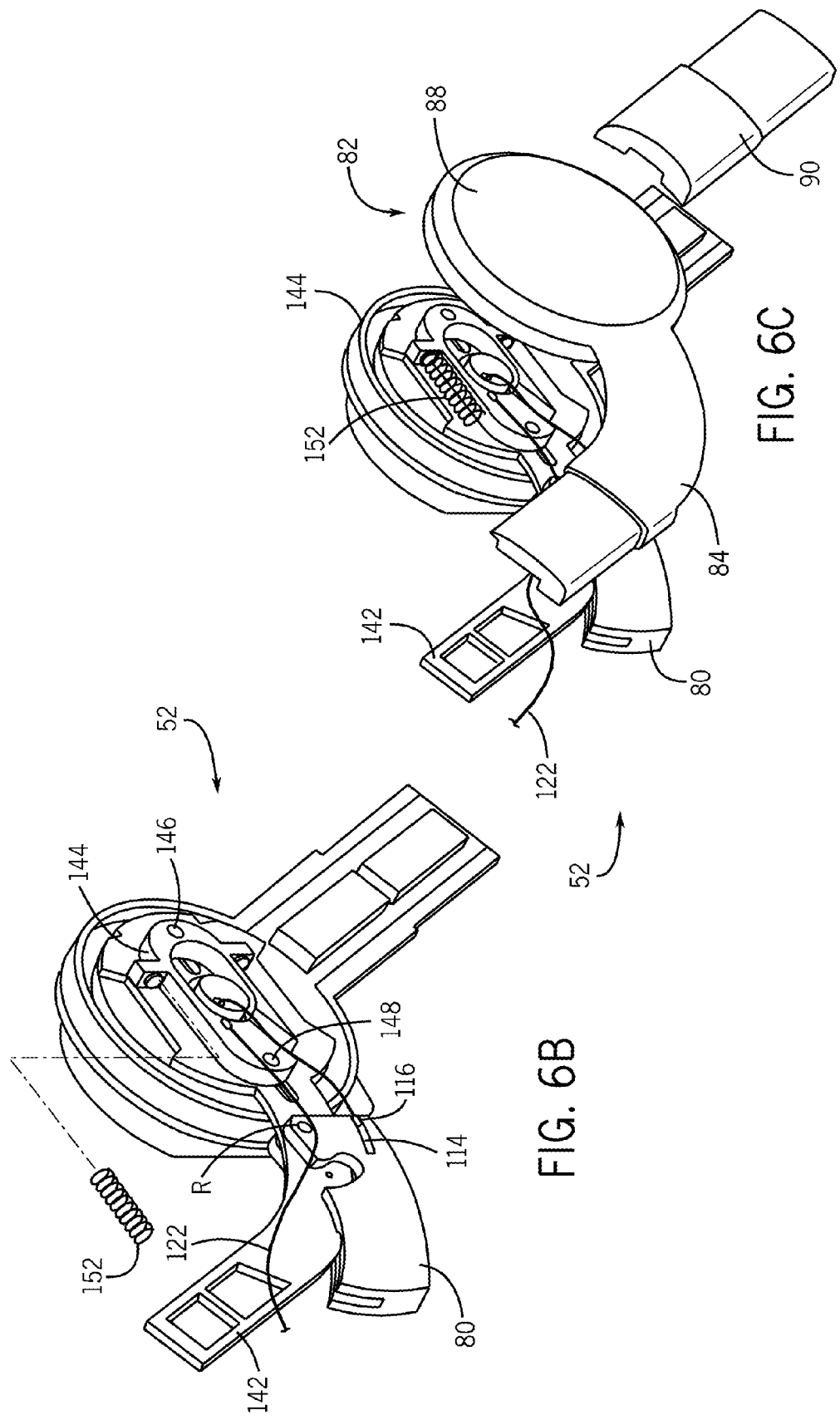

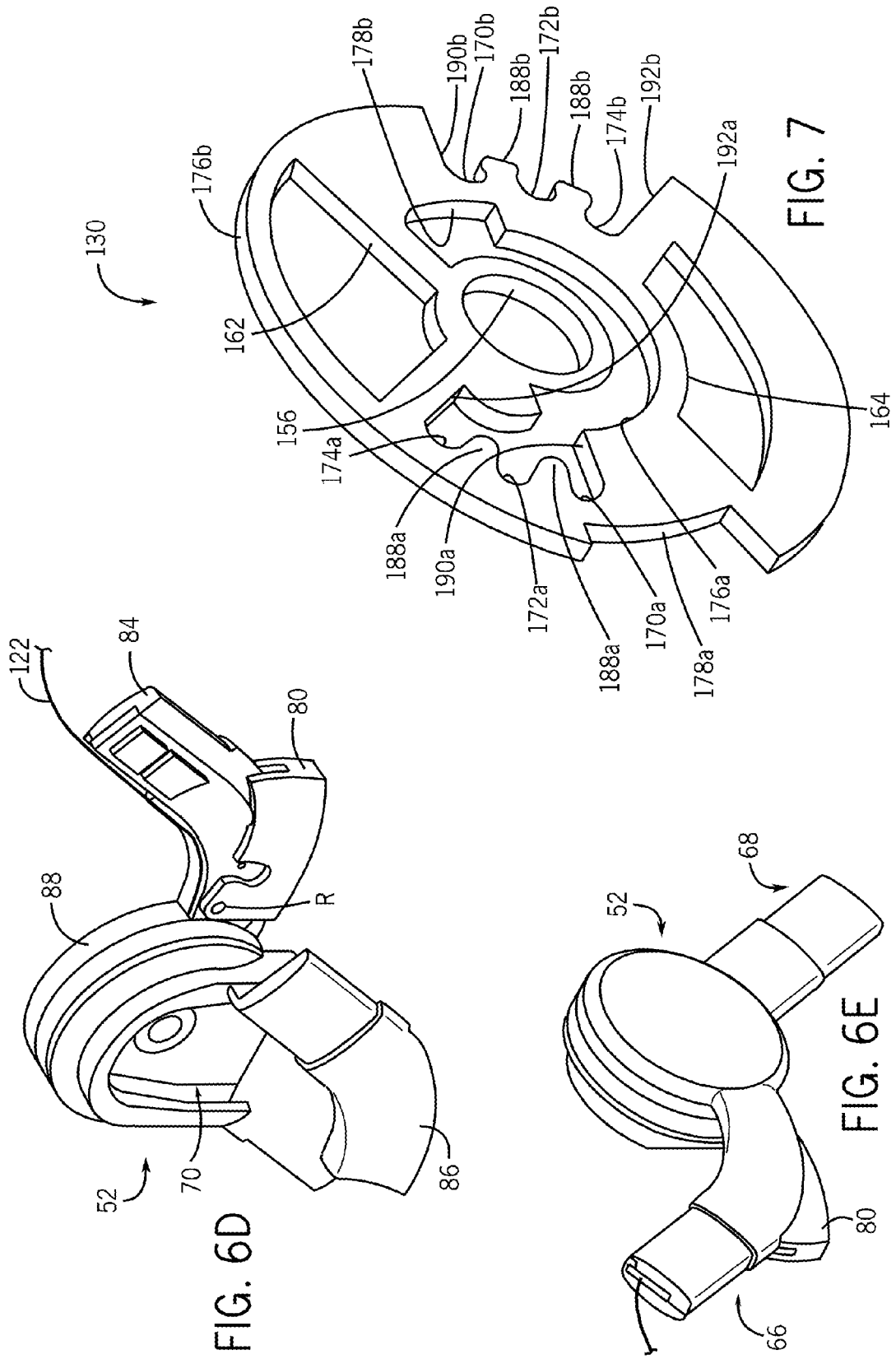

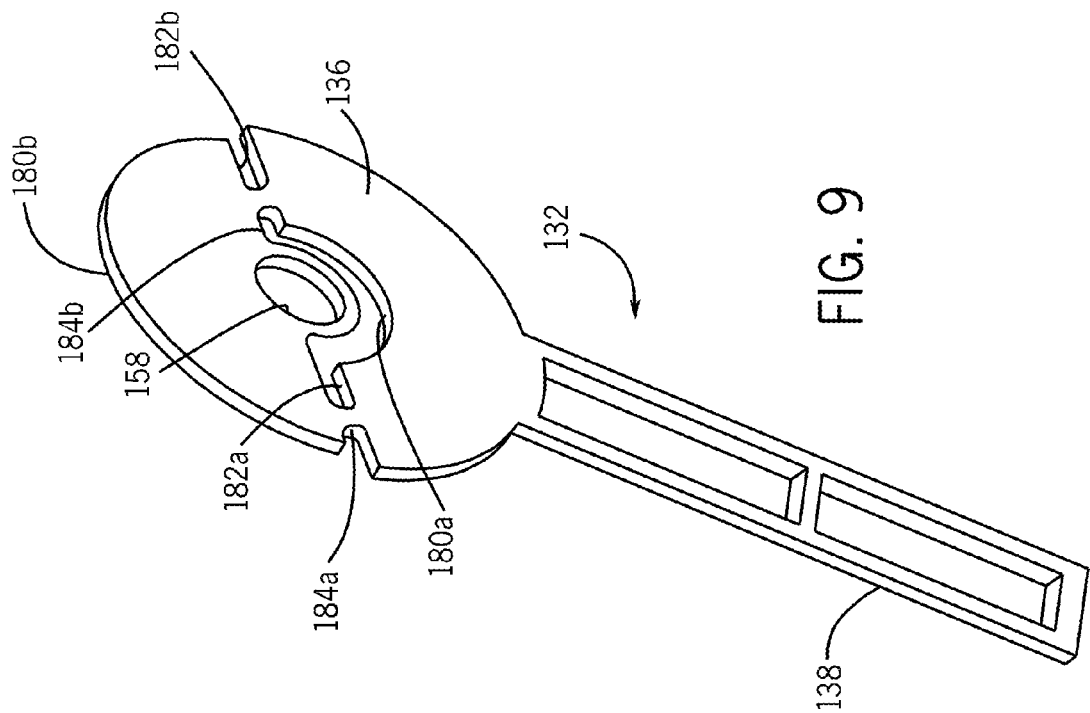
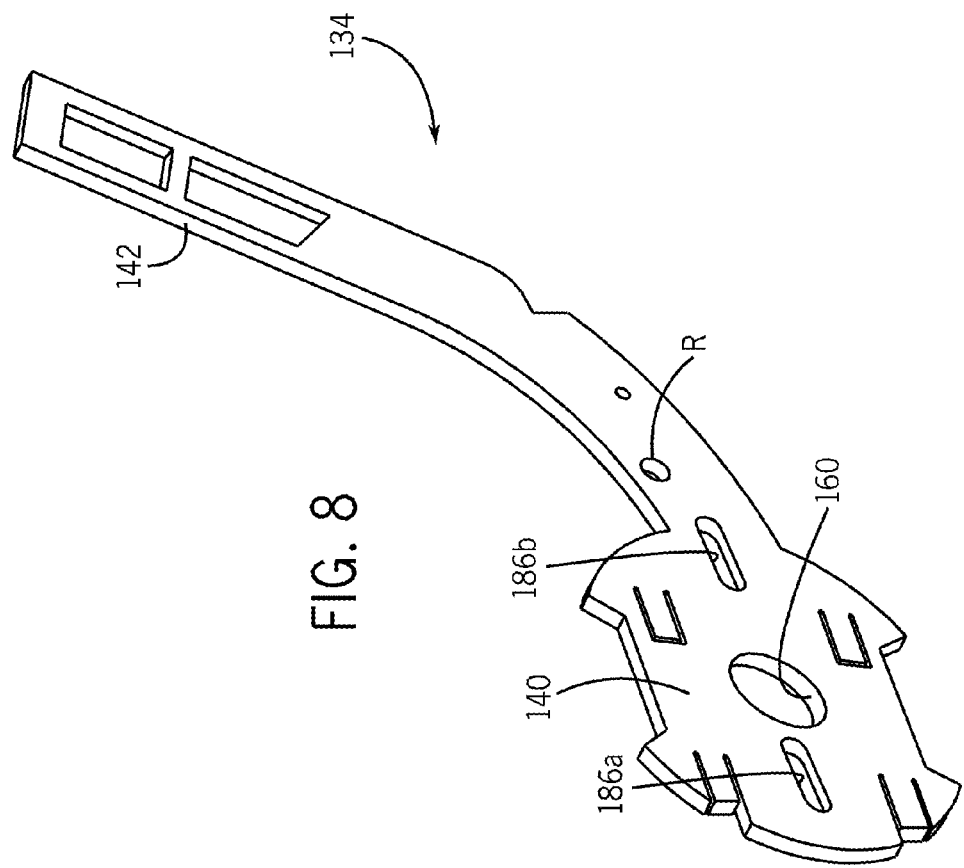

FOLDABLE, REMOVABLE, REVERSIBLE STROLLER SEAT

RELATED APPLICATION DATA

This patent is related to and claims priority benefit of U.S. provisional patent application Ser. No. 61/143,382 filed on Jan. 8, 2009 and entitled "Stroller with Foldable, Removable, Reversible Seat." The entire contents of this prior filed provisional application are incorporated by reference herein.

BACKGROUND

1. Field of the Disclosure

The present disclosure is generally directed to strollers, and more particularly to a foldable stroller having a removable and reversible seat that is foldable between an in-use configuration and a folded configuration along with the foldable stroller frame.

2. Description of Related Art

Strollers should be sturdy and balanced, and should provide the child passenger with safe and comfortable transport. For convenience, conventional strollers move from an in-use configuration to a folded configuration. Foldable strollers are desirable for convenience and ease of transporting and compactness for storage when not being used. Strollers with reversible seats are desirable to give a parent or caregiver a choice whether to push a child from behind or to have a child face the caregiver while being pushed. Having a child, especially a young child or infant, face the caregiver allows the caregiver to make eye contact and to closely interact with the child.

There are a number of existing or known folding stroller configurations that have removable, reversible seats. Removable, reversible seats generally do not fold up with the stroller frame. In such an instance, either it becomes necessary to remove the seat prior to folding the stroller or the size of the unfolded seat can limit the compactness of the folded stroller configuration. This also makes it necessary to store and transport the stroller frame and seat separately. A disadvantage of these known strollers with reversible seats is that the seat must be removed prior to the stroller frame being folded for storage or transport. In such event, the seat must be carried, loaded, and/or stored as a separate piece from the stroller frame.

SUMMARY

A stroller seat has a seat back, a seat bottom, a seat hub assembly joining the seat back to the seat bottom, and an actuator carried on the seat. The actuator can be actuated to permit adjusting the recline angle of the seat back and seat bottom as a unit and can be actuated to permit folding the seat back relative to the seat bottom.

A stroller has a frame and a seat assembly mounted to the frame. The seat assembly has a seat back, a seat bottom, and a hub assembly. The hub assembly can be configured to release and permit removal of the seat assembly from the frame, to permit the seat assembly to mount to the frame in both a forward facing direction and a rearward facing direction, and to permit the seat back to fold relative to the seat bottom.

BRIEF DESCRIPTION OF THE DRAWINGS

Objects, features, and advantages of the present invention will become apparent upon reading the following description in conjunction with the drawing figures, in which:

FIGS. 3A and 3B show the seat frame and the left side seat hub assembly of the stroller shown in FIG. 1, assembled and exploded, respectively, and with the seat soft goods removed.

FIGS. 6A-6C show the seat hub assembly shown in FIGS. 3 and 4 but viewed as in FIG. 5 and progressively further assembled in each figure.

FIG. 6D shows the seat hub assembly shown in FIG. 6C but viewed as in FIGS. 3 and 4, and further assembled.

FIG. 6E shows the fully assembled seat hub assembly and viewed as in FIGS. 5-6C.

FIG. 7 shows a close up perspective view of the stationary plate of the seat hub assembly shown in FIG. 4

FIG. 8 shows a close up perspective view of the upper plate of the seat hub assembly shown in FIG. 4.

FIG. 9 shows a close up perspective view of the lower plate of the seat hub assembly shown in FIG. 4.

DETAILED DESCRIPTION OF THE DISCLOSURE

The disclosed stroller and stroller seat configuration solves or improves upon one or more of the above-noted problems and/or disadvantages in the prior art. The present disclosure is generally directed to a foldable stroller and a removable, reversible seat assembly that can also fold with the stroller frame. The disclosed stroller is capable of being folded compactly while the seat assembly remains attached to the stroller frame. The disclosed seat assembly is also removable and reversible on the stroller frame. The disclosed seat assembly can also be reclined to a plurality of different seat incline angles.

Figure 1:
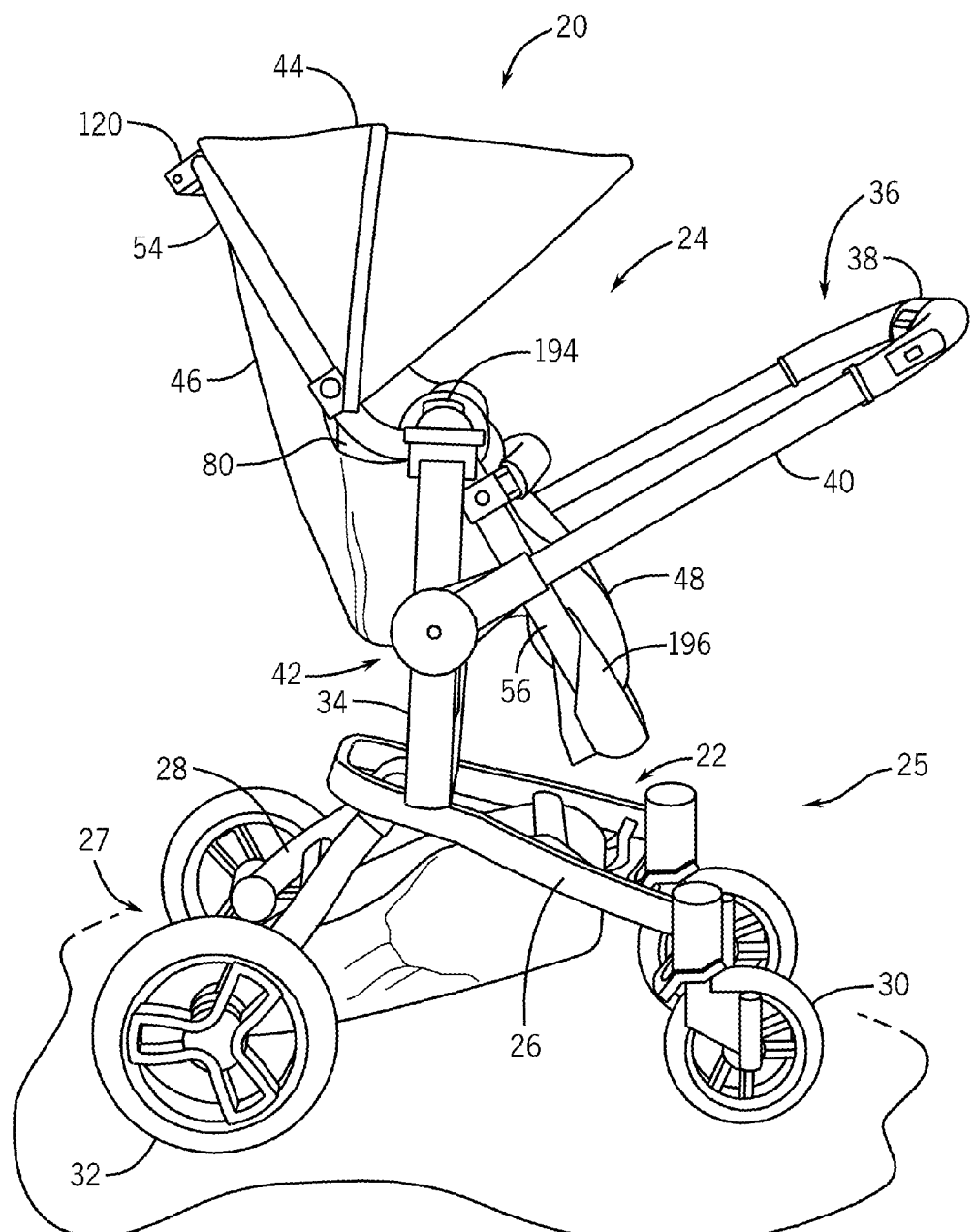
FIG. 1 shows a side view of one example of a stroller including a seat assembly according to the teachings of the present invention.

Turning now to the drawings, FIG. 1 depicts one example of a foldable stroller 20 with a seat assembly 22 that is constructed in accordance with the teachings of the present invention. The stroller 20 in this example has a frame assembly 24 that supports the seat assembly 22. The frame assembly 24 has a front leg structure 25 with a pair of front legs 26 spaced apart across the width of the frame assembly. The assembly 24 also has a rear leg structure 27 with a pair of rear legs 28 spaced apart across the width of the frame assembly. The leg structures 25 and 27 are pivotally connected to one another to allow the frame assembly 24 to fold from an in-use configuration as shown in FIG. 1 to a compact folded configuration (not show). The frame assembly 24 is supported on a plurality of front wheels 30 and rear wheels 32. In the example of FIG. 1, the stroller 20 has two front legs 26 each carrying a single front wheel 30 and two rear legs 32 each carrying a rear wheel 32. The configuration and construction of the frame assembly 24 can vary within the spirit and scope of the present invention. For example, the generally U-shaped front and rear leg structures 25, 27, the front and rear legs 26 and 28, and the number, position, arrangement, and configuration of the wheels 30, 32 can vary.

The disclosed frame assembly 24 has a pair of seat support posts 34 that in this example are connected to and extend upward from the front legs 26. The seat support posts 34 are spaced apart from one another on opposite sides of the stroller frame 24, are connected by a cross bar 35 (see FIG. 2) beneath the seat assembly 22, and are generally upright. The frame assembly 24 in the disclosed example also has a stroller handle 36 with a handlebar 38 extending between two push bars 40. The handle 36 extends rearward behind the seat assembly 22 for pushing and maneuvering the stroller 20. The disclosed handlebar 38 and push bars 40 generally have an inverted U-shape. The push bars 40 each connect to a fold joint or handle joint 42 located on a respective support post 34 of the frame assembly 24. The handle 36 can be configured to reverse, pivotally adjust, and/or pivotally fold up about the handle joints 42. The handle 36 is shown in a reverse position in front of the seat assembly 22 in FIG. 1.

In this example, the seat assembly 22 has an optional canopy 44 and a seat. The seat assembly 22 can have a plastic, metal, or other substantially rigid support covered by soft goods. The seat assembly 22 can define a seat back 46 and a seat bottom 48 as is known in the art. In the disclosed example, the seat assembly 22 is detachable from and mountable to the support posts 34 and can be mounted to the frame assembly in at least two configurations or seat orientations. In a first seat orientation, the seat assembly 22 faces in a normal, forward facing orientation (FIGS. 1 and 2), i.e. facing away from the handle 36 and caregiver (though the handle is shown in a reverse position in FIG. 1). In a second seat facing orientation (not shown herein), the seat assembly faces in a reverse, rear facing orientation, i.e. facing the handle 36 (when in the normal use position, such as in FIG. 1) and the caregiver. The seat assembly may also be capable of reclining in several positions.

Figure 2:
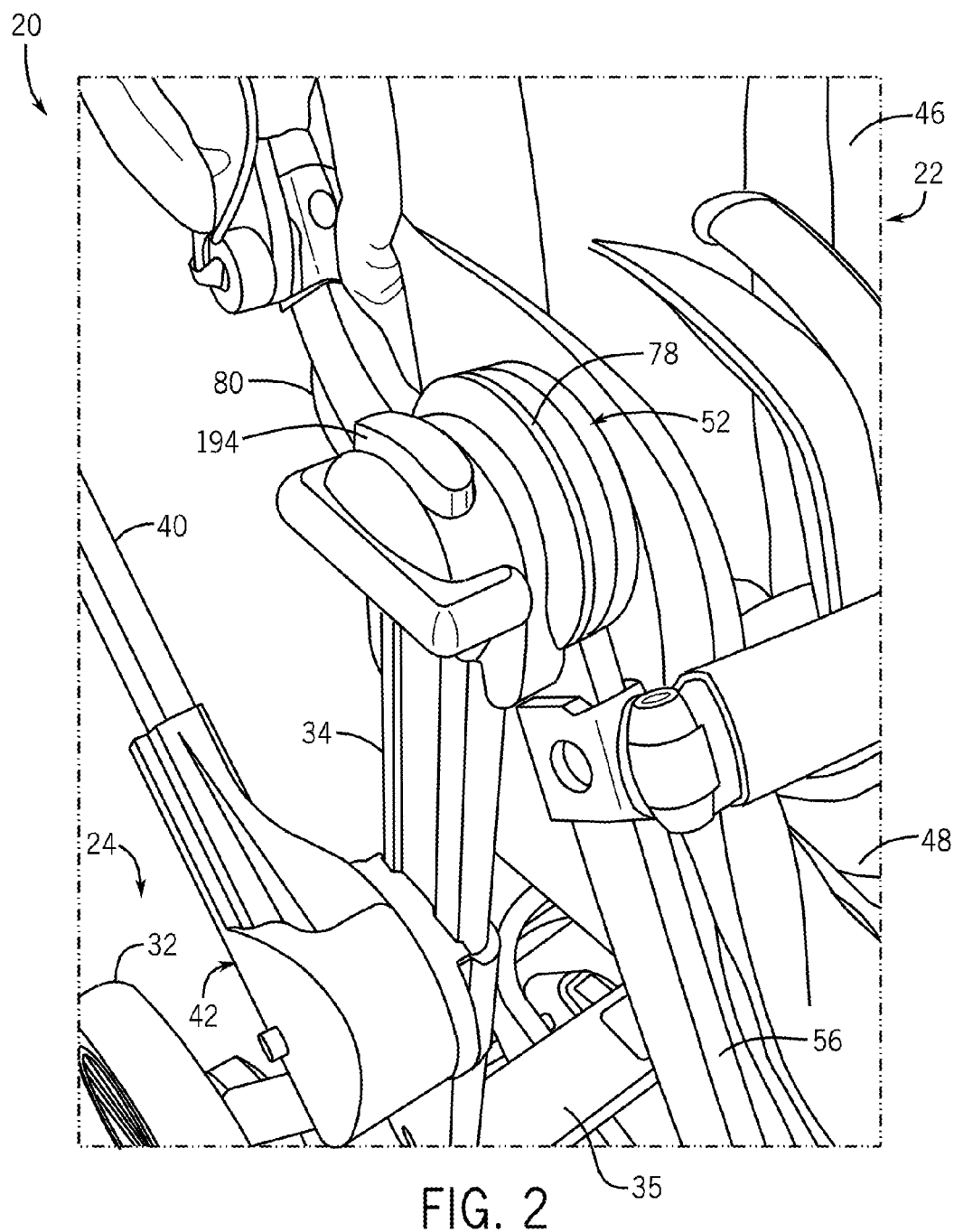
FIG. 2 shows a close up perspective view of the right side seat hub and seat-to-stroller attachment joint of the stroller shown in FIG. 1.

As shown in FIGS. 2, 3A, and 3B, the top of each support post 34 has a mounting location for attaching the seat assembly 22. In this example, the seat assembly 22 has a seat frame 50 including a pair of seat hub assemblies 52, one on each side of the seat frame. The seat frame 50 has an inverted, U-shaped, upper frame section 54 and a U-shaped lower frame section 56 joined to one another at the seat hub assemblies 52. The upper frame section 54 has a pair of seat legs 58 joined by an upper cross member 60. The lower frame section 56 likewise has a pair of seat legs 62 and a lower cross member 64. Each seat hub assembly 52 has an upper connector 66 attached to one of the upper seat legs 58 and a lower connector 68 connected to one of the lower seat legs 62. In this example, the connectors and seat legs can be tubular and attach to one another telescopically. Alternate constructions and attachment techniques can also be utilized, if desired.

Each seat hub assembly 52 is essentially a minor image of the other. Thus, only one seat hub assembly is described in detail herein, the description of the one being equally applicable to the other. FIGS. 3A and 3B show the left side seat hub assembly 52, which has a seat mount socket 70 on the exterior side. The seat mount socket 70 has an open bottom end with a chamfered or ramp shaped leading edge 72. The seat mount socket 70 has a pair of spaced apart, grooved side walls 74 and a curved, grooved top wall 76 that define a female socket functionality (see FIG. 4). The seat assembly 22 can be lowered onto a corresponding connector housing 78 (see FIG. 2) on the top of the seat post 34. Though not shown herein, the connector housing 78 has an interior facing surface with a male connector with a partial annular rib that slides upward into the groove of the female socket. The center of the male connector has a latch hole (not shown) therein. A release button or lever 80 is positioned near and just rearward of the seat mount socket 70 on the underside of the upper connector 66.

Figure 4:
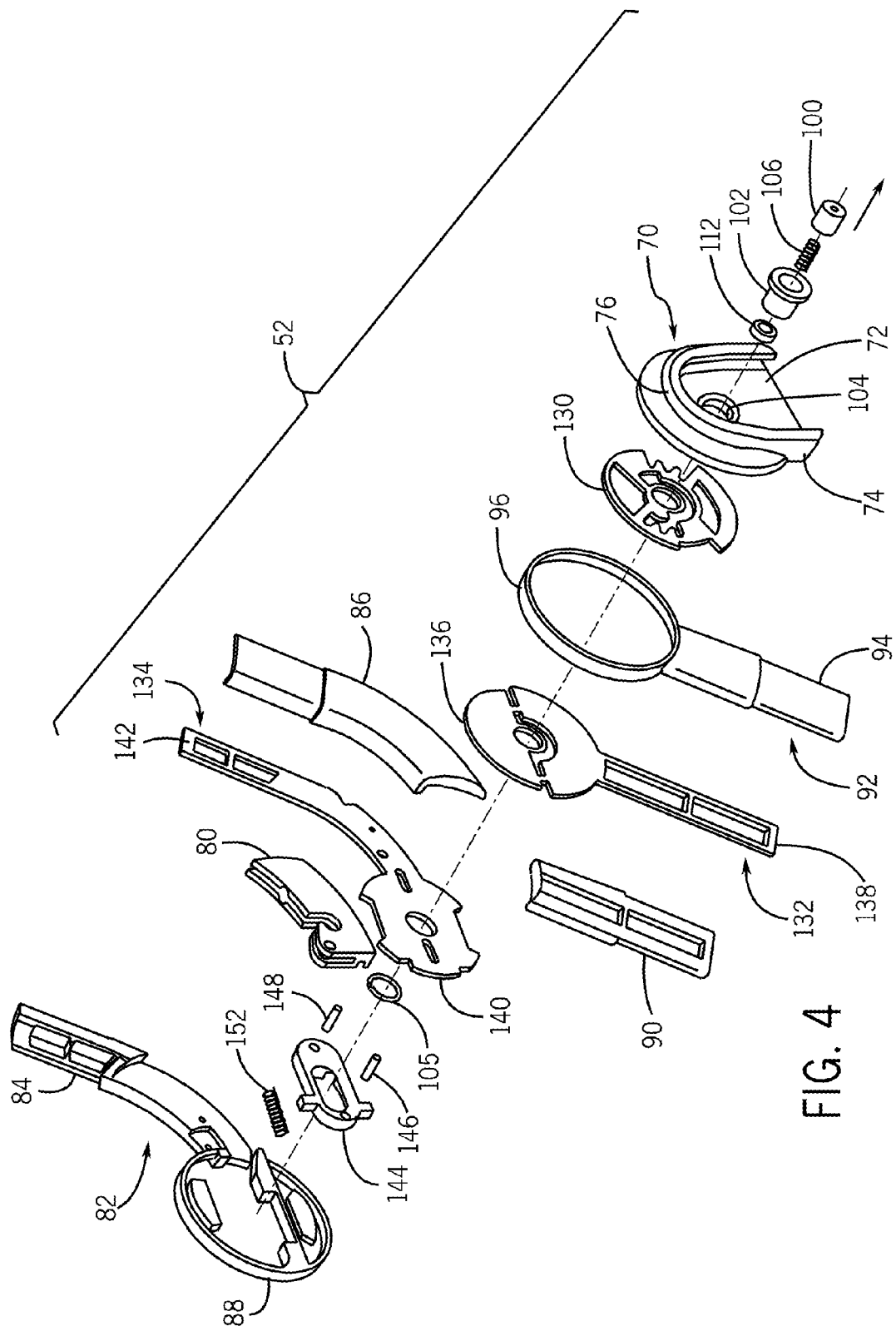
FIG. 4 shows an exploded perspective view of the seat hub assembly shown in FIG. 3.
Figure 5:
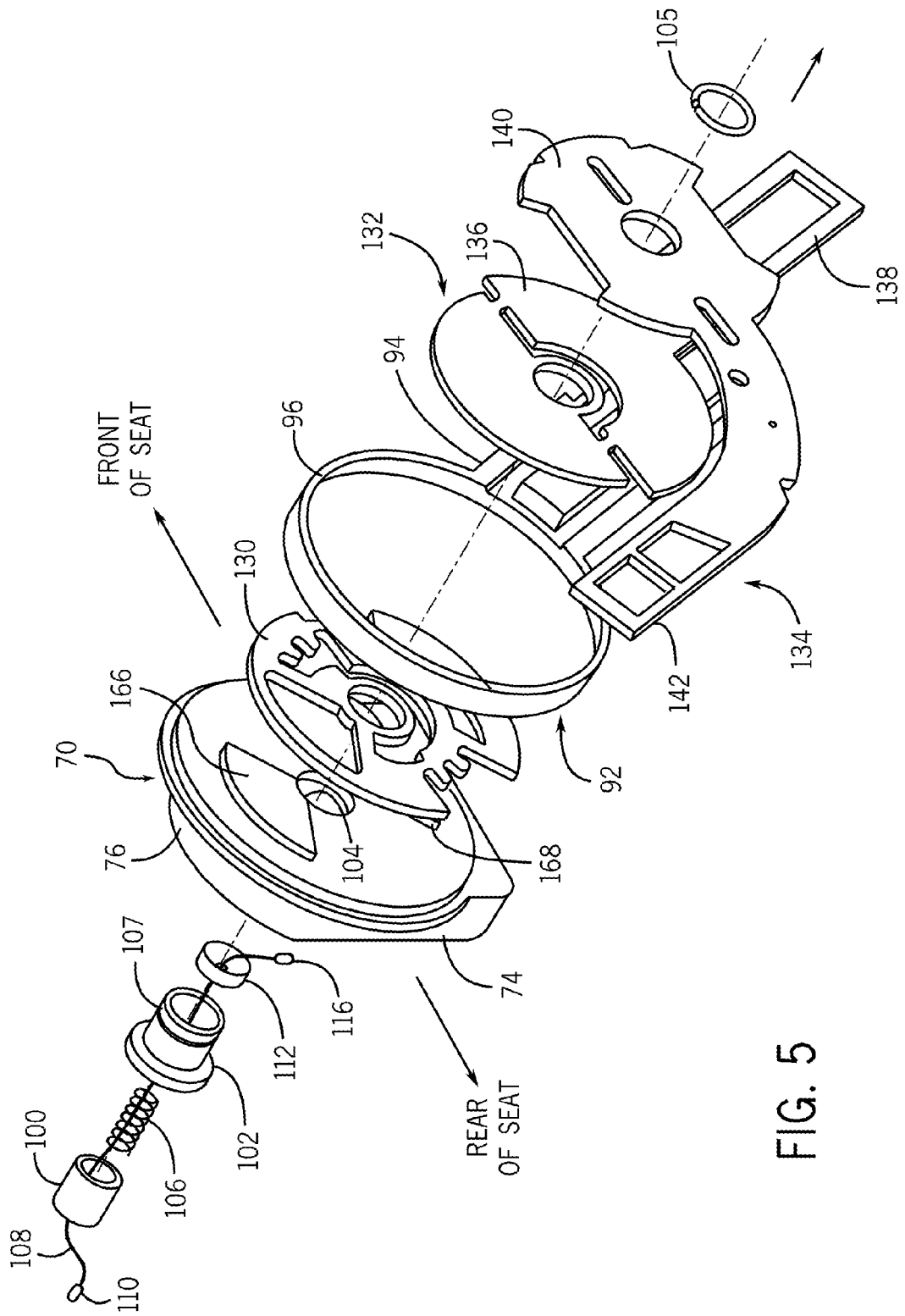
FIG. 5 shows a reverse perspective view of a portion of the exploded seat hub assembly shown in FIGS. 3 and 4.

FIGS. 4 and 5 show exploded views of the seat hub assembly 52. FIGS. 6A-6E show the seat hub assembly 52 as it is progressively assembled. In this example, the assembly 52 has an upper inside cover 82 with an upper extension 84 and an upper outside cover 86. The upper outside cover 86 and the upper extension 84 of the upper inside cover 82 together form the upper connector 66 of the seat hub assembly 52 when assembled. The upper inside cover also has an inside cover plate 88 at the lower end of the upper extension 84. The assembly 52 also has a lower inside cover 90 and a lower outside cover 92. The outside cover 92 has a lower extension 94 and an open hoop 96 at the top end of the extension. The lower inside cover 90 and the extension 94 on the lower outside cover 92 form the lower connector 68 of the seat hub assembly 52 when assembly. The inside cover plate 88 and the outside hoop 96 are concentric with one another when assembled. The open hoop 96 is sandwiched between the inside cover plate 88 and the seat mount socket 70 when assembled and define an interior cavity of the seat hub assembly 52.

The release button 80 is pivotally connected at a pivot R at its forward end to the upper connector 66. A latch pin 100 is slidable within a sleeve 102 that is seated in a central opening 104 in the seat mount socket 70. A spring 106 biases the latch pin so as to normally extend or protrude from the central opening 104 in the surface of the seat mount socket 70. A retaining ring 105 is seated in a groove 107 in the sleeve 106 to retain the sleeve 106 in axial position within the central opening 104. A release cable 108 has a slug 110 on one end connected to and extending through the latch pin 100 and sleeve 102. A funnel or cyclone shaped insert 112 is seat in the inside end of the sleeve 102. The release cable 108 extends through the sleeve 102 and is guided gradually by the surface of the insert 112 around the exterior surface of the cover plate 88 toward the release button 80. The release button 80 has a cable slot 114 and a slug 116 on the opposite end of the release cable 108 is captured in the cable slot 114 and connected to the release button 80.

Figure 6A:
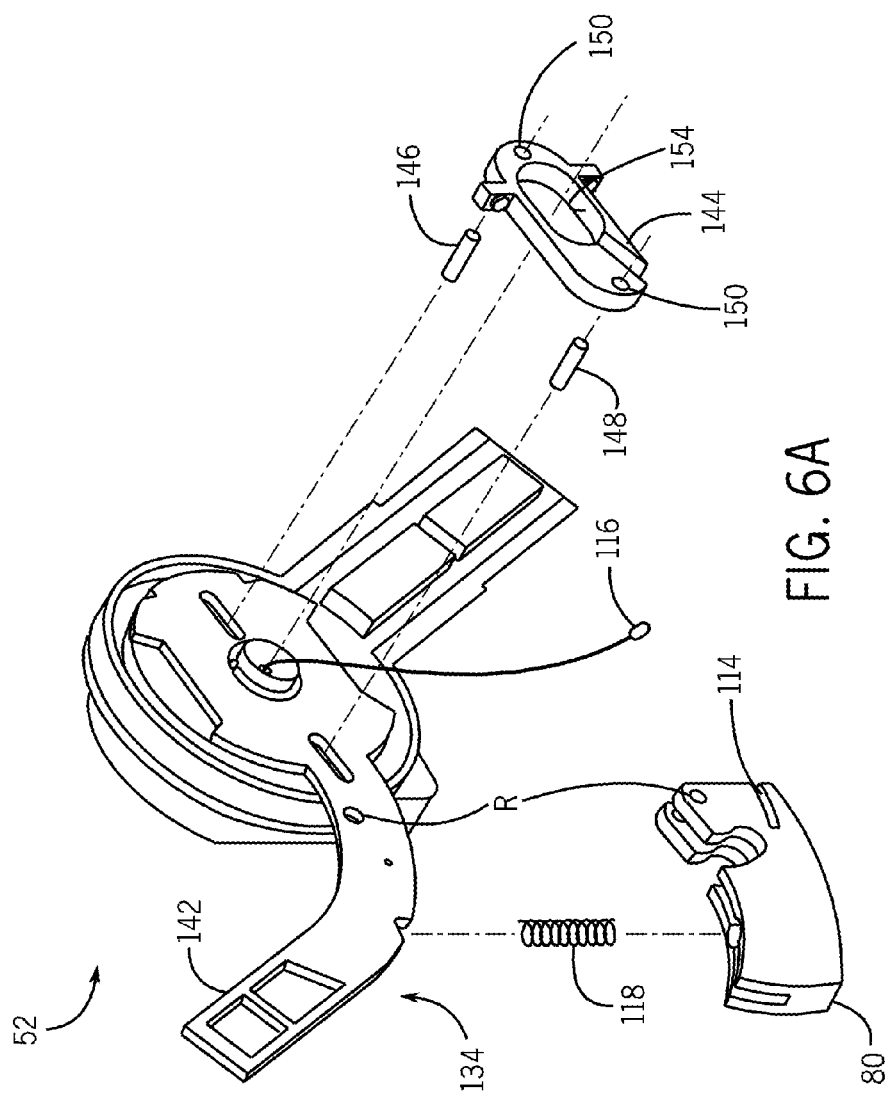

When the seat assembly 22 is attached to the connector housing as in FIGS. 1 and 2, the seat mount socket 70 is connected to the male connector on the connector housing. The central opening 104 in the seat mount socket 70 is aligned with the latch hole in the male connector. The latch pin 100 is biased by the spring 106 into the latch hole to secure or latch the seat assembly on the stroller 20. The release button 80 is biased downward to a non-actuated position by a button spring 118, as shown in FIG. 6A.

To release the seat assembly 22, the release button 80 is actuated by depressing the rear end of the release button upward against the bias of the spring 118 and into the upper connector 66. The release button 80 pivots about the pivot R, such that the forward end of the release button is pulled away from the connector 66. This in turn pulls the release cable 108 away from the connector. The release cable 108 pulls or withdraws the latch pin 100 from the latch hole in the male connector on the seat post connector housing 34. The latch pin 100 is withdrawn back into the central opening 98 of the seat mount socket 70 when the release button 80 is actuated. When the release buttons are actuated, the seat assembly 22 can be lifted off of the seat posts 34 and detached from the stroller.

As noted above, the seat assembly 22 can be turned around and reattached to the seat posts 34. The seat assembly 22 can be installed on the stroller 20 in either a forward facing orientation (see FIG. 2) or a reverse or rear facing orientation (se FIG. 1).

As shown in FIGS. 1, 3A, and 3B, the seat assembly 22 also has an actuator 120 on the cross member 60 of the upper frame section 54. A pair of cables 122 runs from the actuator 120, one each through one of the legs 58 of the upper frame section 54 and down to the respective seat hub assemblies 52. In this example, the actuator 120 can be actuated by squeezing the actuator into the cross member 60. The actuator can selectively either adjust the incline/recline of the entire seat assembly 22 when installed on the stroller 20 or fold the seat in half in order to fold the stroller. The seat hub assembly 52 is configured, not only to provide the seat release functionality described above, but also to provide both a seat recline function and a seat fold function, as described in greater detail below. The seat hub assemblies 52 combine a number of functions into a compact package.

As depicted in FIGS. 4 and 5, the seat hub assembly 52 has a number of additional components. The seat hub assembly 52 has a stationary plate 130 captured within the open hoop 96 adjacent the interior of the seat mount socket 70. The seat hub assembly 52 also has a pair of additional plate structures including an outer plate structure 132 and an inner plate structure 134. The outer plate structure 132 has an outer plate 136 positioned adjacent the open hoop 96 and against the stationary plate 130. The structure 132 also has a fixing tab 138 that projects downward from the outer plate 136. The fixing tab 138 is shaped to mate with and is captured between the inside lower cover 90 and the lower extension 94 on the outside lower cover 92. This fixes the outer plate structure 132 to the lower frame section 56 of the seat assembly 22.

The inner plate structure 134 has an inner plate 140 positioned adjacent the inside cover plate 88 on the inside cover 86 and against the outer plate 136. The structure 134 also has a fixing tab 142 that projects upward from the outer plate 136. The fixing tab 142 is shaped to mate with and is captured between the upper extension 84 on the upper inside cover 82 and the upper outside cover 86 and held in place. This fixes the inner plate structure 134 to the upper frame section 54 of the seat assembly.

A shuttle 144 is connected to one of the cables 122 (see FIGS. 6B and 6C) and has a pair of shuttle pins 146, 148 that project outward from the shuttle. In this example, the pins 146, 148 are sturdy (can be steel or the like, but can vary) elements seated through holes 150 in the shuttle 144. Alternatively, the shuttle 144 can be integrally formed with the pins 146, 148 projecting therefrom. The shuttle pins 146, 148 are seated in tracks and holes in the various plates, as is described below. The shuttle 144 in this example is mounted against the interior face of the inner plate 140 (see FIGS. 4 and 6A-6C). A shuttle spring 152 biases the shuttle 144 and the pins 146, 148 forward (see FIGS. 6B and 6C). The shuttle has an elongate slot 154 between the locations of the shuttle pins 146, 148. The slot 154 overlies the location of the latch pin 100, the sleeve 102, the shaped insert 112, and the release cable 108 (see FIGS. 6B and 6C). The shuttle 144 can travel rearward upon pulling on the cable 122 using the actuator 120. The shuttle slot 154 allows clearance for and does not interfere with the seat release function and components.

With reference to FIGS. 5 and 7-9, the various details of the stationary plate 130, the outer plate 136, and the inner plate 140 are now described. Each of these plates has a central opening 156, 158, and 160, respectively, and each central opening is axially aligned with one another and with the central opening 104 in the seat mount socket 70. The latch pin 100, sleeve 102, shaped insert 112, and release cable 108, seat within and along these aligned openings and the retaining ring 105 holds the sleeve in place.

As shown in FIGS. 5 and 7, the stationary plate 130 has a pair of shaped alignment holes 162, 164. These holes coincide in location and shape with a pair of protrusions 166, 168 that project from the inside face of the seat mount socket 70. When the seat hub assembly 52 is assembled, the protrusions seat in the holes and rotationally fix or lock the stationary plate to the seat mount socket 70. The stationary plate 130 has a cut-out region interior to the perimeter edge of the plate. The cut-out region defines three recline notches 170a (fully upright position), 172a (intermediate position), and 174a (fully reclined position) for the seat assembly 22. The cut-out region also defines a first fold track 176a that extends circumferentially about 180° around the central opening 156. The track 176a extends from the fully upright notch 170a to, and terminates in, a fold notch 178a spaced about 180° from the fully reclined notch. Each notch 170a, 172a, 174a, and 178a extends in a radial outward direction from the radial location of the track 176a.

The top perimeter edge of the stationary plate 130 defines a second fold track 176b. One end of the second fold track 176b terminates in a fold notch 178b positioned 180° from the fold notch 178a. The opposite end of the second fold track 176b joins with a fully upright notch 170b in the perimeter edge of the plate 130. The fully upright reclined notch 170b is adjacent an intermediate recline notch 172b, which in turn is adjacent a fully reclined notch 174b. The exterior notches 170b, 172b, and 174b in the perimeter edge of the plate 130 are each positioned circumferentially 180° from the corresponding interior notches 170a, 172a, and 174a.

As shown in FIG. 9, the outer plate 136 also has a circumferential first fold track 180a located interior of the perimeter edge of the plate and spaced radially from the central opening 158. The top perimeter edge of the outer plate 136 defines a second circumferential fold track 180b spaced radially outward from the first track 180a. Each track 180a, 180b, terminates at one end in an in-use position slot 182a, 182b, respectively. The slots 182a, 182b are elongate, extend radially, and are circumferentially spaced 180° from one another. The slots 182a, 182b are long enough to permit full translation of the shuttle 144 and the shuttle pins 146, 148 as described below. Each track terminates at the opposite end in a shorter fold position slot 184a, 184b, respectively. The fold position slots 184a, 184b also extend radially and are circumferentially spaced 180° from one another.

As shown in FIG. 8, the inner plate 140 has a pair of shuttle travel slots 186a, 186b, each extending in a radial direction and each aligned with one another across the axis of the central opening 160. Each of the shuttle travel slots 186a, 186b is also elongate and can at least in part define the limits of travel for the shuttle 144, as described below. With reference again to FIG. 7, the interior grouping of recline notches 170a, 172a, and 174a is separated from one another by short protrusions 188a Likewise, the exterior grouping of recline notches 170b, 172b, and 174b is separated by from one another by short protrusions 188b. The protrusions have a length or height that is about half of the shuttle travel permitted in this example. As described below, the actuator 120 can be partly actuated to impart only partial travel of the shuttle 144 in order to adjust the incline/recline of the seat assembly 22. The actuator 120 can be fully actuated to impart full travel of the shuttle 144 in order to fold the seat back 46 relative to the seat bottom 48 before folding the stroller 20.

The disclosed seat assembly 22 reclines or inclines as a whole. The seat back 46 does not recline relative to the seat bottom 48 in this example. However, one could undertake to redesign the various plate notches, slots, and tracks to accomplish recline of only the seat back, if desired. Particularly, the outer plate 136 could be reconfigured so as to permit relative recline of the seat back and seat bottom.

In this example, the fold tracks 176a, 176b on the stationary plate 130 overlie and coincide positionally with the tracks 180a, 180b, respectively on the outer plate 136 when assembled. The shuttle travel slots 186a, 186b, respectively, also overlie these tracks. The shuttle pin 146 is received through the travel slot 186a and the shuttle pin 148 is received through the travel slot 186b in the inner plate 140. The pin 146 is also captured in the interior fold track 176a on the stationary plate 130 and in the interior track 180a on the outer plate 136. Likewise, the pin 148 rides along the perimeter edge or exterior fold track 176b on the stationary plate 130 and along the exterior track 180b on the outer plate The primary purpose of the recline/fold shuttle 144 is to release and/or fix the plates 130, 136, 140 relative to one another to lock the seat, permit reclining of the seat, and permit folding of the seat. The shuttle 144 can be moved by actuating the actuator 120 on the seat assembly 22. When not actuated and with the seat unfolded and in the fully upright position, the shuttle 144 is biased forward by the shuttle spring 152, which in turn biases the pins 146, 148 toward the forward ends of the respective shuttle travel slots 186a, 186b in the inner plate 140. The pins 146, 148 are also biased and seated in the respective fully inclined notches 170a, 170b in the stationary plate 130. Further, the pins 146, 148 are biased and seated in the forward ends of the respective in-use position slots 182a, 182b in the outer plate 136.

The seat assembly 22 disclosed herein can be reclined backward as a single unit by partially actuating the actuator 120. This will draw the shuttle 144 and pins 146, 148 partly rearward within the travel sots 186a, 186b. With only partial shuttle movement, the pins 146, 148 will not yet clear the in-use position slots 182a, 182b. Thus, the inner plate 140 (fixed to the seat back 46) and the outer plate 136 (fixed to the seat bottom) will not yet be free to rotate relative to one another about the axis of the central openings 158, 160 in the plates. Thus, the seat back 46 cannot yet be folded or moved relative to the seat bottom 48. Instead, the seat assembly 22 remains locked or rigid. However, with only partial movement of the shuttle 144, the pins 146, 148 will clear the protrusions 188a, 188b adjacent the fully upright notches 170a, 170b. This will allow the shuttle 144 and thus the seat assembly 22 to be pivoted. As a result, the entire seat assembly 22 can be rotated about the central opening axis to adjust the incline angle of the seat. A user can select an intermediate recline orientation by releasing the actuator such that the shuttle pins seat in the intermediate recline notches 172a, 172b. Alternatively, a user can select a fully reclined position by allowing the pins 146, 148 to seat in the respective fully reclined notches 174a, 174b. One can adjust the seat assembly 22 recline angle in either direction and as desired by partially actuating the actuator 120 as described.

As shown in FIG. 7, the stationary plate 130 has a stop surface 190a adjacent the fully upright notch 170a and a stop surface 192a adjacent the fully reclined notch 174a Likewise, stop surfaces 190b and 192b are located adjacent the respective notches 170b and 174b. These stop surfaces can limit the incline or recline travel angle in each direction. If desired, more than three or less than three recline positions can be provided for the seat assembly 22 by altering the number of recline notches from the three disclosed and described herein. Also, the seat can be removable, reversible, and foldable without having any recline capability, if desired. One could do so by eliminating the selectable notches 170a and b, 172a and b, and 174a and b.

The seat assembly 22 can be folded by fully actuating the actuator 120 and when the seat is in the fully upright orientation. When fully actuated, the shuttle 144 will travel to its full extent. The pins 146, 148 will move rearward and bottom against the opposite ends of the respective travel slots 186a, 186b in the inner plate 140. By doing so, the pins 146, 148 will clear the respective in-use position slots 182a, 182b in the outer plate 136 and be free to travel along the respective tracks 180a, 180b. Also, the pins 146, 148 will clear the protrusions 188a, 188b and clear the stop surfaces 190a, 190b in the stationary plate 130. Thus, the shuttle pins 146, 148 will be free to travel along the respective tracks 176a, 176b therein. In this condition, the inner plate 140 (fixed to the seat back 46) can be pivoted relative to the outer plate 136 (fixed to the seat bottom) about the axis of the central openings 158, 160 in the plates. Thus, the seat back 46 can now be folded or moved forward and downward relative to the seat bottom 48. As the seat back 46 is folded, the pins 146, 148 will travel along the respective tracks 176a, 176b and 180a, 180b until reaching the opposite ends of the tracks. The pins will then bottom against the end of the fold notches 178a, 178b and the fold slots 184a, 184b. The shuttle spring 152 will then bias the shuttle 144 and pins toward the forward direction and seat the pins 146, 148 in the fold notches 178a, 178b and fold slots. The seat back 46 is then retained in the folded position and the shuttle 144 and pins 146, 148 are in a folded or storage position. To unfold the seat assembly 22 in this example, the actuator 120 must be actuated to the degree necessary for the pins 146, 148 to clear the fold notches 178a, 178b and to clear the fold slots 184a, 184b.

The lone actuator 120 in this example accomplishes both the recline adjustment and folding the seat. In addition to the recline/fold functionality, the seat assembly 22 is also removable and reversible on the stroller 20, as described above. The release button 80 is separate from the fold/recline actuator 120 in this example. The release button 80 can be located elsewhere on the stroller, if desired. For example, a release button 194 can alternatively be positioned on the stroller 20 instead of the seat assembly 22, such as on top of the connector housings 78 (see FIGS. 1 and 2). Likewise, the actuator 120 need not be at the top of the seat assembly 22, but instead could be moved to an alternate location. The release cables 108 and the fold/recline cables 122 can also be routed differently that in the disclosed example, whether alternate actuator/button locations are utilized or not.

The location of the release button 80 in this example helps to position the lift point for the seat assembly 22 such as when removing and/or transporting the seat, near the center of gravity of the seat assembly. Locating the release button near the lift point of the seat assembly 22 and near the center of gravity of the seat assembly can help to avoid accidental tipping of the seat if the caregiver were to incorrectly lift the seat assembly with the child still seated. As noted above, the release button may be located on the frame connection for the mount socket. Alternatively, the release button may be located on the top of the connector housing 78. It may also be possible to incorporate all three of the fold, release, and recline functions into one actuator or button.

The disclosed stroller seat is especially well suited for use with a foldable stroller 20. The seat assembly 22 is very versatile and can be easily transported in a folded condition when removed from the stroller 20. However, the combination of features disclosed and described herein help to solve the problem of having to remove the seat prior to folding the frame and having to transport the seat and frame separately. In the present example, many of the frame and seat components can be formed of metal, such as steel or aluminum, having suitable weight, strength, and rigidity. However, some of the metal parts may be replaced with plastic parts, based on analysis of strength requirements.

Because the recline/fold mechanism within the seat hub assembly 52 occupies most of the interior space in this example, the release mechanism is cleverly and compactly designed to reside within the central sleeve 102. The sleeve 102 can act as a bearing for the pivoting motions of the seat assembly 22. However, the latch pin 100 is housed inside the sleeve 102. The routing of the release cable 108 is relatively simple. However, because the release button 80 in this example is attached to components that fold with the seat back 46 the cable is routed through the center axis of the seat hub assembly 52.

The disclosed seat hub assembly 52 combines a number of functions into a compact package. Most removable, reversible stroller seats do not fold, which makes them bulky to store with the stroller. Furthermore, using a single actuator to accomplish both fold and recline eliminates complexity from the user's standpoint and simplifies the stroller visually.

As will be evident to those having ordinary skill in the art, the various seat assembly, seat hub assembly, and stroller frame components, as well as the position of the stroller fold joints, can vary and yet fall within the spirit and scope of the present invention. Changes in geometric shape and component movement can be accomplished by altering the contour of the various frame components. Similarly, the joint locations can be moved from the positions shown in order to accomplish alterations in frame and seat movement and folding configuration as well.

The lower seat frame section 56 can include a foot rest 196 positioned at the bottom of the seat assembly 22. In the disclosed example, the seat back 46 and seat bottom 48 can be at least partly made of fabric or similar materials and be suspended from the upper and lower seat frame sections 54 and 56 when attached. Alternatively, portions of the seat assembly 22 can have a removable non-fabric cover placed over the rigid frame components that define and shape at least part of the seat, such as the seat bottom and/or the seat back support surfaces. Once the seating elements are attached to the seat frame, the seat assembly 22 can be sufficiently supported on the support posts 34 of the stroller 20 and substantial enough to support the weight of a child occupant.

The seat hub assembly 52 may also include various bushings, retainers, fasteners, washers, or other parts in order to facilitate smooth operation. No such parts have been disclosed or described herein.

Although certain stroller seat features and components have been described herein in accordance with the teachings of the present disclosure, the scope of coverage of this disclosure is not limited thereto. On the contrary, this disclosure covers all embodiments of the teachings of the disclosure that fairly fall within the scope of permissible equivalents.

What is claimed is:

1. A stroller seat comprising:
a seat back;
a seat bottom;
a seat hub assembly joining the seat back to the seat bottom and having at least one shuttle pin therein and having a stationary plate, the stationary plate having a central opening, a notched region defining a plurality of recline notches a first radial distance outward from the central opening, and a fold track a second radial distance outward from the central opening, the second radial distance greater than the first radial distance; and
one actuator carried on the seat, the one actuator being partially actuable to partially disengage the at least one shuttle pin from the plurality of recline notches but not the notched region to permit adjusting a recline angle of the seat back and seat bottom together as a unit relative to a part of the seat hub assembly and the one actuator being fully actuable to fully disengage the at least one shuttle pin from the notched region to permit the at least one shuttle pin to reach the fold track and permit folding the seat back relative to the seat bottom.

2. A stroller comprising:
a frame;
a seat assembly mounted to the frame and having a seat back, a seat bottom, and a hub assembly with a central axis, a stationary plate, and a pair of shuttle pins therein, the stationary plate having a notched region with a plurality of recline notches spaced a first radial distance from the central axis and having a fold track spaced a second radial distance greater than the first radial distance from the central axis; and
one actuator partially actuable to partially disengage the pair of shuttle pins from the plurality of recline notches to permit adjusting a recline angle of the entire seat assembly as a unit about the central axis,
wherein the hub assembly is further configured to release and permit removal of the seat assembly from the frame, to permit the seat assembly to mount to the frame in both a forward facing direction and a rearward facing direction, and to permit the seat back to fold relative to the seat bottom when the one actuator is fully actuated to fully disengage the pair of shuttle pins from the notched region and to align the pair of shuttle pins with the fold track.

3. The stroller seat according to claim 1, wherein the stroller seat is mountable to a stroller frame having a receiver to receive a part of the seat hub assembly.

4. The stroller seat according to claim 1, wherein the seat hub assembly is configured to release and permit removal of the seat assembly from a stroller frame, to permit the seat back and seat bottom as a unit to mount to the stroller frame in both a forward facing direction and a rearward facing direction, and to permit the seat back to fold relative to the seat bottom.

5. The stroller seat according to claim 4, further including a release button, wherein when the release button is actuated the seat back and seat bottom as a unit can be lifted off of the stroller frame.

6. The stroller seat according to claim 5, wherein the release button is positioned on a part of the seat frame.

7. The stroller seat according to claim 1, wherein the seat hub assembly joins an upper frame section defining the seat back and a lower seat frame defining the seat bottom.

8. The stroller seat according to claim 7, wherein the upper frame section and the lower frame section are each U-shaped.

9. The stroller seat according to claim 8, wherein the one actuator is disposed on the upper frame section.

10. The stroller seat according to claim 9, wherein the seat hub assembly includes a seat mount socket and when the one actuator is partially actuated to adjust the recline angle of the seat back and seat bottom as a unit, the recline angle is adjusted relative to the seat mount socket.

11. The stroller according to claim 2, wherein the one actuator is carried on the seat assembly and, when fully actuated, permits the seat back to move from a fully upright position to a fully folded position relative to the seat bottom.

12. The stroller according to claim 11, wherein the seat assembly pivots to recline as a unit and to fold relative to a part of the hub assembly.

13. The stroller according to claim 2, wherein the frame further includes a seat post having a male connector housing on a top of the seat post, and wherein the hub assembly has a seat mount socket having an open bottom end defining a female socket to receive the male connector housing.

14. The stroller according to claim 2, wherein the hub assembly comprises an upper connector joined to an upper frame section and having an inside cover plate, and a lower connector joined to a lower frame section and having an outside hoop, wherein the inside cover plate and the outside hoop are rotationally concentric with one another, and wherein the inside cover plate and the outside hoop rotate relative to one another when folding the upper frame of the stroller seat section relative to the lower frame section of the stroller seat.

15. The stroller according to claim 2, wherein the seat assembly has two spaced apart sides and two hub assemblies, one on each side of the seat assembly and each a mirror image of the other.

16. The stroller according to claim 15, wherein the one actuator is configured to actuate the two hub assemblies.

17. A stroller comprising:
a frame; and
a seat assembly mountable to the frame and including
a seat back,
a seat bottom, and
a hub assembly joining the seat back to the seat bottom having a plurality of plates arranged around a central axis and having at least one shuttle pin, the plurality of plates including one plate connected to the seat back, another plate connected to the seat bottom, and a stationary plate having a notched region with a plurality of recline notches spaced a first radial distance from the central axis and having a fold track spaced a second radial distance greater than the first radial distance from the central axis, the hub assembly configured both to permit adjustment of a recline angle of the seat back and the seat bottom as a unit and to permit the seat back to fold relative to the seat bottom; and
one actuator carried on the seat assembly, the one actuator partially actuable to partially disengage the at least one shuttle pin from the plurality of recline notches but not disengaging the one plate relative to the other plate to permit adjusting the recline angle of the entire seat assembly as a unit relative to the plurality of recline notches and prevent the one plate and the other plate from pivoting relative to one another and the one actuator fully actuable to fully disengage the at least one shuttle pin from the notched region and to disengage the one plate from the other plate to permit the one plate to pivot relative to the other plate and to permit folding the seat back relative to the seat bottom,
wherein the hub assembly is further configured to release and permit removal of the seat assembly from the frame and to permit the seat assembly to mount to the frame in both a forward facing direction and a rearward facing direction.

18. The stroller according to claim 17, wherein the seat assembly has a seat post with a male connector housing on a top of the seat post, and wherein the hub assembly has a seat mount socket having an open bottom end defining a female socket to receive the male connector housing.

19. The stroller according to claim 18, wherein the hub assembly comprises an upper connector joined to the seat back and to the one plate, and a lower connector joined to the seat bottom and to the other plate, wherein the upper connector and the one plate and the lower connector and the other plate are rotationally joined with one another and rotate relative to one another when folding the seat back relative to the seat bottom, and wherein the upper connector and the one plate and the lower connector and the other plate are stationary relative to one another and rotate together as a unit relative to the seat mount socket when adjusting the recline angle of the entire seat assembly.

20. The stroller according to claim 17, wherein the seat assembly has two spaced apart sides each having a hub assembly, and the one actuator actuates both hub assemblies.

* * * * *